UNITED STATES PATENT OFFICE.

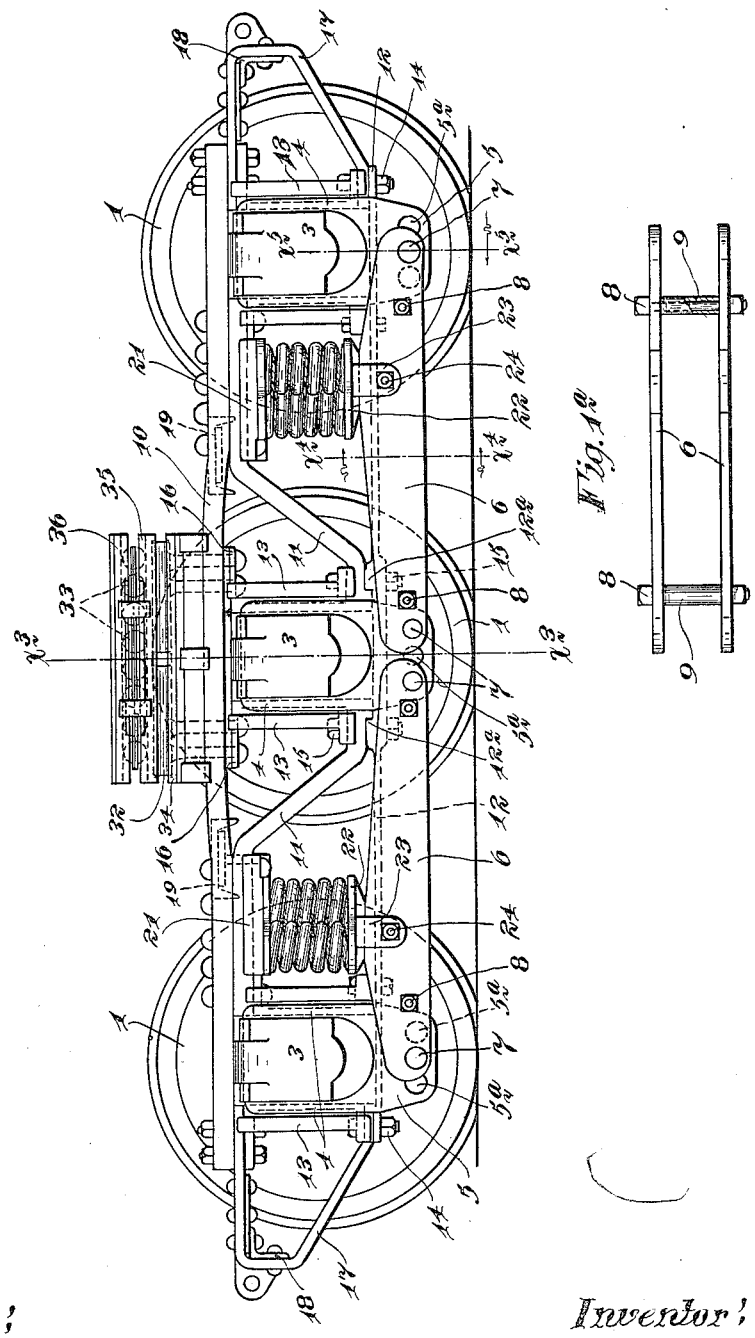

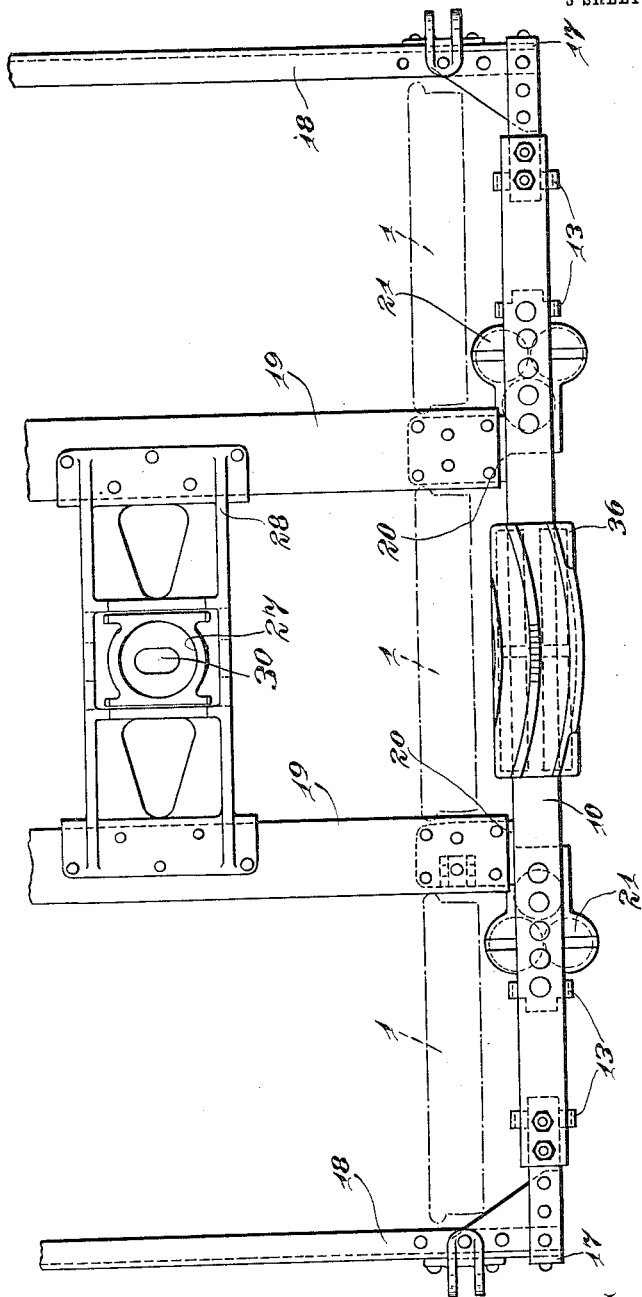

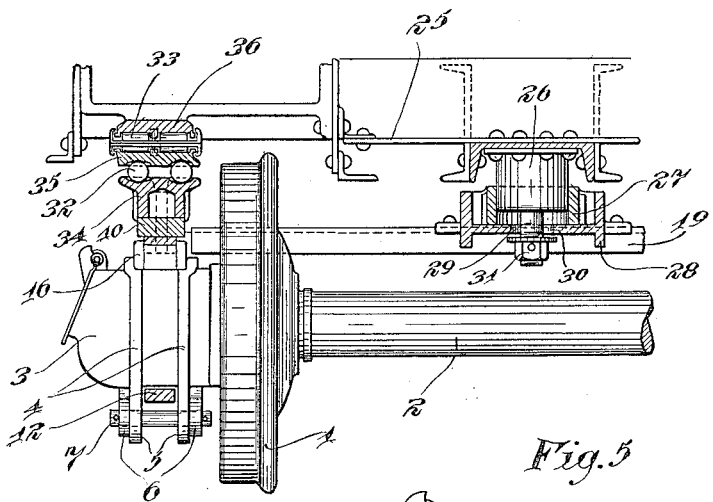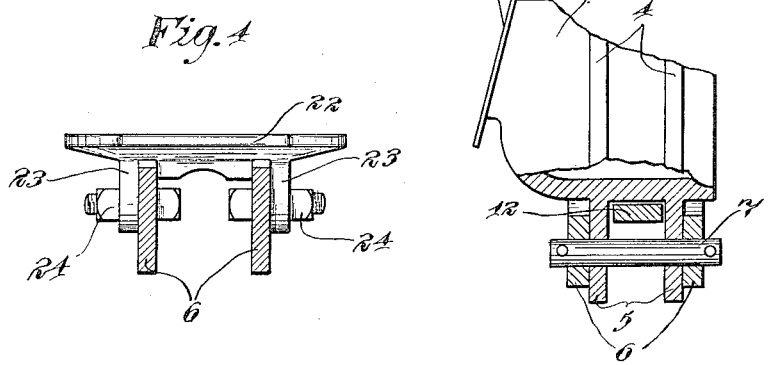

JOHN C. BARBER, OF CHICAGO, ILLINOIS, ASSIGNOR TO STANDARD CAR TRUCK COMPANY, OF CHICAGO, ILLINOIS, A CORPORATION OF NEW JERSEY.

CAR-TRUCK.

1,036,541.  Specification of Letters Patent.  Patented Aug. 27, 1912.

Application filed September 21, 1911. Serial No. 650,596.

*To all whom it may concern:*

Be it known that I, JOHN C. BARBER, a citizen of the United States, residing at Chicago, in the county of Cook and State of Illinois, have invented certain new and useful Improvements in Car-Trucks; and I do hereby declare the following to be a full, clear, and exact description of the invention, such as will enable others skilled in the art to which it appertains to make and use the same.

My invention has for its object to provide an improved car truck of large carrying capacity, and to such ends, generally stated, the invention consists of the novel devices and combinations of devices hereinafter described and defined in the claims.

Especially, the present invention is designed as an improvement on, or modification of, that type of six-wheel car trucks which is disclosed and broadly claimed in my prior Patent No. 945,672, of date, January 4th, 1910, and wherein equalizing levers or bars are employed in connection with truck springs to transmit the load evenly from the truck side frames to all of the truck wheels.

The trend of the railway development in railway rolling stock has been to employ, year after year, cars of larger and larger capacity, and at the present, cars having a carrying capacity of as high as 150,000 to 200,000 pounds are in demand. Up to approximately 100,000 pounds capacity, cars with two trucks having four wheels each have been found practicable, but to carry heavier loads, two six wheel trucks are in demand. In these six wheel trucks, problems are encountered which are not present in the four wheel trucks. The increase in the length of the wheel base of six wheeled trucks, over the wheel base of the four wheel trucks, should be kept to a minimum, so that the six wheels will properly run on curves. The relatively long side frames of the six wheeled trucks must be designed to carry heavy loads, and practical provision should be made for permitting the removal of the intermediate wheels and axles, as well as the end wheels and axles, from the truck frames. In these six-wheeled trucks, and in the four-wheeled trucks, for that matter, there is great economy and convenience in making the journal boxes, and as many other parts of the truck as possible, in duplicates, so that they may be constructed from single patterns, easily and conveniently assembled and interchangeably used. The problem of transmitting the load from the car body to the side frames of the six-wheel trucks is different in many respects from that of transmitting the load to the side frames of four-wheel trucks. For instance, the center wheels lie directly under the body bolsters of the car body, so that a truck bolster cannot be employed without raising the car body objectionably high. Also, anti-friction lateral motion and radial motion devices are desirable in connection with six-wheeled, as well as in connection with four-wheeled car trucks. All of the above noted desirable features are found in the car truck designed in accordance with my present invention.

In the present improved car truck I make use of anti-friction lateral and swivel motion bearings or connections which, *per se*, are, in principle, of the same kind as those disclosed in my prior Patents, No. 863,012, of date, August 13, 1907, and No. 875,565, of date, December 31st, 1907, and in the Lake and Deverall Patent No. 798,350, of date August 29, 1905. As a highly important feature of the present invention, these combined lateral motion and radial motion bearing debined lateral motion and radial bearing devices are located directly over the journals of the intermediate or central wheels, and are directly interposed between the truck side frames and overlying end portions of the car body bolster. Otherwise stated, the combined lateral and radial motion devices are located directly over the central journal boxes and are vertically movable with the truck side frames and in respect to the said underlying journal boxes. Stated in still another way, the central portions of these combined lateral motion and radial motion devices are located approximately at the points where the vertical planes of the truck side frames intersect vertical planes that include the axes of the respective car wheels and axles. This relieves the truck side frames from torsional or lateral twisting strains and permits the car body bolster to be brought as low down and as close to the tops of the central truck wheels as running clearance will permit.

In the accompanying drawings which illustrate the invention, like characters indicate like parts through the several views.

Referring to the drawings, Figure 1 is a side elevation showing the improved car truck; Fig. 1$^a$ is a detail view showing in plan one of the equalizing levers or bars; Fig. 2 is a plan view showing approximately one-half of the car truck, some parts being removed and some parts being broken away; Fig. 3 is a transverse section taken approximately on the line $x^3$ $x^3$ of Fig. 1, showing also one of the car body bolsters, some parts being broken away; Fig. 4 is a detail in section taken approximately on the line $x^4$ $x^4$ of Fig. 1, and Fig. 5 is a section taken on the line $x^5$ $x^5$ of Fig. 1, some parts being broken away and some parts being shown in full.

The car wheels 1 are secured to axles 2, having journals mounted in the customary way in journal boxes 3. These journal boxes, on their sides, are provided with laterally spaced vertically extended guide flanges 4 cast integral therewith, and extended downward under the bottoms of said boxes to form lugs 5 to which equalizing levers 6 are pivotally connected, preferably by heavy coupling pins 7. These equalizing levers 6 are each preferably made up of a pair of laterally spaced flat bars rigidly connected by tie bolts 8 and spacing thimbles 9, as best shown in Fig. 1$^a$. For an important purpose which will hereinafter appear, each lug 5 is provided with three perforations 5$^a$, the intermediate perforations being located centrally in respect to a vertical line intersecting the axis of the journal box.

The truck side frames are of the arch bar type, and comprise the top or compression bar 10, an arch bar 11, a bottom tie bar 12, and pedestals 13. The top bar 10 extends over the three alined journal boxes, while the bottom tie bar 12 extends under all three of the said journal boxes. The ends of the arch bar 11 extend over the outer or end journal boxes and are bolted, riveted, or otherwise rigidly secured to the end of the corresponding top bar 10. The arch bar 11 extends to the bottom of the central or intermediate box and is provided with shoulders that are engaged by shoulders 12$^a$ of the bottom tie bar 12, and the latter is thickened at its central portion where it spans the gap between the sections of the arch bar 11. This thickened central portion of the said bar 12 is, therefore, utilized to complete the arch bar 11 and to afford a detachable supplemental part thereof. The guide flanges 4 of the journal boxes embrace and work vertically on the pedestals 13. These pedestals 13 have flanged upper and lower ends that are rigidly secured by rivets or bolts, to the bars 10, 11 and 12, of the respective side frames. Furthermore, these pedestals 13 are made all alike, or in duplicate, one of the other, so that any one thereof, may be applied to any one of the several different places in the truck frames. The connections between the lower ends of the pedestals 13 and the frame bars 11 and 12 are preferably made by nut-equipped bolts 14 and 15, the former of which are applied to the end pedestals and the latter of which are applied to the central or intermediate pedestals. The use of these bolts 14 and 15 permits the bolts and tie bars 12 to be detached, and hence, the journal boxes, removed from the side frames when the truck frame is lifted or jacked up. In the use of the pedestals 13, all of one length, it is desirable to place a reinforcing strip 16, (see Fig. 1) between the upper ends of the intermediate pedestals and the overlying central portion of the top bar or compression member 10. These pedestals, as is evident, may be suitably flanged and all cast from one pattern. End brackets 17 are secured to the ends of the side frames, preferably by the same bolts that connect the end pedestals 13 to the bars 10 and 12. These end brackets 17 carry, and are rigidly secured to the ends of end cross ties 18.

The main cross ties 19, which are preferably rolled steel channels, are, at their ends, riveted to brackets 20, preferably, and as shown, formed integral with spring caps 21. These spring caps 21 are preferably channel-shaped and made to fit the under sides of the horizontal portions of the frame arch bars 11, and are rigidly secured to the latter and to the top bars 10 by suitable rivets or bolts.

The spring bases 22 which are located directly below the coöperating spring caps 21, are applied to the intermediate portions of the corresponding equalizer levers 6, and preferably, they are formed with depending lugs 23 that embrace the bars of the said levers and are connected thereto by nut-equipped bolts 24.

The truck springs, which are preferably arranged in four groups of three each, are interposed between the coöperating spring caps 21 and spring bases 22, and, as is evident, they support the truck side frames from the journal boxes, through the equalizing levers 6 in such manner that the said side frames are capable of the proper vertical movements in respect to the car wheels. Or, stated in another way, the journal boxes are capable of limited, independent vertical movements in the truck side frames. The laterally spaced lugs 5, to which the equalizer levers 6 are pivotally connected, also very greatly assist in holding the journal boxes against movements transversely of the truck frame. By reference to Fig. 1, it will be noted that the said equalizing levers 6 are pivotally connected to the centrally located perforations 5$^a$ of the outside or end journal boxes, but are pivotally connected to the outer or end perforations 5ª of the central journal box. Hence, by providing the lugs or flange extensions 5ª of all of the boxes with three perforations, they are made interchangeable, that is, are made all alike and in such manner that any journal box may be applied between any pair of pedestals of the truck. Also, it follows that the said journal boxes may be all made from a single pattern. The equalizer levers 6 are also made all alike, and hence, may be interchangeably used or applied.

One of the car body bolsters is, in Fig. 3, indicated as an entirety by the numeral 25. This body bolster should be connected to the main cross tie bars 19 in such manner that the car trucks are capable of a pivotal or swinging movement and of limited lateral motion in a direction transversely of the car. This may be accomplished in different ways but, as shown, the body bolster 25 is provided with a hub 26 pivoted directly in a bearing 27 that is mounted to slide transversely of the truck, in the pocket of a center bearing bracket 28, which, in turn, is riveted or otherwise rigidly secured to the said main cross tie bars 19. Also, this pivotal connection between the car truck and body bolster should be such that the latter is capable of slight vertical movements, and to this end, a pintle bolt 29, carried by the hub 26, is arranged to work through a slot 30 in the center bearing bracket 28, and is provided with a nut 31 located below the bottom of said bracket.

As already indicated, the combined radial and lateral motion devices employed in this truck are of the character disclosed and claimed in my prior Patent No. 863,012, of date, August 13, 1907, entitled car truck. Also, as stated, these devices are, as an important novel feature of the present invention, applied directly over the central journal boxes of the six wheeled trucks and are interposed between the truck side frames and the overlying portions of the car body bolster. For the purpose of this case, parts of these combined radial and lateral motion devices may be briefly identified as follows: The numeral 32 indicates the rollers of the lateral motion devices, and the numeral 33 indicates the rollers of the radial motion devices. The said lateral motion rollers 32 are interposed between roller bases 34 and combined roller caps and bases 35, and the said radial motion rollers 33 are interposed between the said combined roller caps and bases 35 and upper roller caps 36. The roller bases 34 are bolted, riveted, or otherwise rigidly secured to the tops of the central portions of the truck side frames, while the upper roller caps 36 are secured to the end portions of the car body bolster 25. For engagement with the radial motion rollers 33, the said elements 35 and 36 are provided with flat horizontal surfaces. For engagement with the lateral motion rollers 32, the said elements 33 and 35 are provided with concave roller seats which coöperate with the said rollers to gravity-hold the body bolster 25 and car body in an intermediate position.

The six-wheel car truck designed as above illustrated and described has a base of minimum length and will carry the body of a car as low down as any four-wheel truck having wheels of equal diameter.

What I claim is:

1. The combination with a six-wheel car truck, of lateral motion devices applied to the side frames thereof directly over the central journal boxes.

2. The combination with a six-wheel car truck, of radial motion devices applied to the side frames thereof directly over the central journal boxes.

3. The combination with a six-wheel car truck, of combined lateral and radial motion devices applied to the side frames thereof directly over the central journal boxes.

4. The combination with a six-wheel car truck having equalizer levers and springs supporting its side frames from its journal boxes, of antifriction lateral motion bearing devices applied to the truck side frames directly over the central journal boxes.

5. The combination with a six-wheel car truck having equalizer levers and springs supporting its side frames from its journal boxes, of antifriction radial motion bearing devices applied to the truck side frames directly over the central journal boxes.

6. The combination with a six-wheel car truck having equalizer levers and springs supporting its side frames from its journal boxes, of antifriction combined lateral and radial motion devices applied to the truck side frames directly over the central journal boxes.

7. The combination with a six-wheel car truck and a car body bolster connected thereto with freedom for swiveling and for limited endwise movements transversely of said truck, of combined lateral and radial motion antifriction bearing devices located directly over the central journal boxes and directly interposed between the truck side frames and the overlying portions of said body bolster 8. A car truck having pedestals, separately constructed but made alike and interchangeably usable or applicable in the truck side frames, said side frames having arch bars inserted under the intermediate pedestals to give increased depth to the central portion of the truck side frames.

9. In a car truck, the combination with side frames, of journal boxes having integral, depending, laterally spaced lugs straddling the adjacent lower portions of said side frames, equalizing levers pivotally connected to the depending lugs of said journal boxes, and springs interposed between said equalizing levers and side frames, substantially as described.

10. In a six-wheel car truck, side frames having end and intermediate pairs of pedestals, arch bars extending from the lower ends of the intermediate pedestals to the top bar of said side frames, and a bottom tie bar connecting the lower ends of said pairs of pedestals, in combination with journal boxes guided for vertical movements by said pedestals, equalizer levers pivotally connected to the end and intermediate journal boxes, and truck springs interposed between said equalizer levers and the side frames of said truck.

11. In a six-wheel car truck, side frames having end and intermediate pairs of pedestals, and a bottom tie bar connecting the lower ends of said pedestals, in combination with journal boxes, guided for vertical movements by said pedestals and provided with depending lugs that embrace the said bottom tie bars, equalizer levers pivoted to the depending lugs of said journal boxes, and truck springs interposed between the intermediate portions of said levers and the overlying upper portions of said truck side frames.

12. In a six-wheel car truck, side frames having end and intermediate pairs of pedestals and a bottom tie bar connecting the lower ends of said pedestals, in combination with journal boxes guided by said pedestals and having depending lugs that embrace said tie bars, equalizer levers made up of laterally spaced bars rigidly connected in pairs and pivotally connected to the depending lugs of said journal boxes, and truck springs interposed between the intermediate portions of said equalizer levers and the overlying upper portions of said truck side frames.

13. In a six-wheel car truck, the combination with truck side frames, of journal boxes vertically movable therein and having depending lugs formed with end and intermediate perforations, equalizer levers pivotally connected to certain of the perforations of said journal box lugs, and truck springs interposed between said levers and the truck side frames, the said journal boxes being all alike and interchangeably usable or applicable in the truck side frames.

14. A six-wheel car truck provided with end and intermediate journal boxes having depending lugs and made all alike and interchangeably usable or applicable in the truck side frames.

15. A journal box provided with laterally spaced vertical pedestals engaging flanges extended downward under the bottom of said box and perforated to afford lugs to which an equalizing lever may be pivotally attached.

16. In a six-wheel car truck, the combination with truck side frames having end and intermediate pairs of pedestals, a top bar, an arch bar and a bottom tie bar, of journal boxes working between the said pairs of pedestals, equalizer levers pivotally connected to said journal boxes, spring bases secured to the intermediate portions of said equalizer levers, spring caps secured to the upper portions of said side frames, and truck springs interposed between said spring bases and spring caps.

17. In a six-wheel car truck, the combination with truck side frames having end and intermediate pairs of pedestals, a top bar, an arch bar and a bottom tie bar, of journal boxes working between the said pairs of pedestals, equalizer levers pivotally connected to said journal boxes, spring bases secured to the intermediate portions of said equalizer levers, spring caps secured to the upper portions of said side frames, truck springs interposed between said spring bases and spring caps, main cross tie bars connecting the upper intermediate portions of said side frames, end brackets secured at the ends of the truck side frames, and end cross tie bars connecting the said end brackets.

18. In a six-wheel car truck, the combination with truck side frames having end and intermediate pairs of pedestals, a top bar, an arch bar and a bottom tie bar, of journal boxes working between the said pairs of pedestals, equalizer levers pivotally connected to said journal boxes, spring bases secured to the intermediate portions of said equalizer levers, spring caps secured to the upper portions of said side frames, truck springs interposed between said spring bases and spring caps, and cross tie bars connected to inwardly extended portions of said spring caps, substantially as described.

In testimony whereof I affix my signature in presence of two witnesses.

JOHN C. BARBER.

Witnesses:
LEE W. BARBER,
MARTHA G. PEET.

---

Copies of this patent may be obtained for five cents each, by addressing the "Commissioner of Patents, Washington, D. C."